(12) United States Patent
Baiyor et al.

(10) Patent No.: US 6,574,325 B1
(45) Date of Patent: Jun. 3, 2003

(54) APPARATUS METHOD AND SYSTEM FOR PROVIDING CALL PROGRESS INFORMATION FOR MULTIPLE LEG TELECOMMUNICATION SESSIONS FOR INTELLIGENT NETWORK SERVICES

(75) Inventors: Robert John Baiyor, Naperville, IL (US); Deborah Thomas Earl, Naperville, IL (US); Harold Robert Smith, Jr., Oakbrook Terrace, IL (US); Thomas Dale Strom, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/350,577

(22) Filed: Jul. 9, 1999

(51) Int. Cl.[7] .................................................. H04M 3/42
(52) U.S. Cl. ............................. 379/211.01; 379/211.02; 379/211.03; 379/211.04
(58) Field of Search ........................ 379/211.01, 202.01, 379/211.02, 211.03, 211.04, 219, 233, 49

(56) References Cited

U.S. PATENT DOCUMENTS

| | | | | |
|---|---|---|---|---|
| 4,700,374 A | * | 10/1987 | Bini .............................. 455/456 |
| 5,166,972 A | * | 11/1992 | Smith .............................. 379/49 |
| 5,206,901 A | * | 4/1993 | Harlow et al. ......... 379/211.04 |
| 5,329,578 A | * | 7/1994 | Brennan et al. ....... 379/211.03 |
| 5,430,791 A | * | 7/1995 | Feit et al. ................. 379/88.01 |
| 5,454,032 A | * | 9/1995 | Pinard et al. .......... 379/167.05 |
| 5,502,762 A | * | 3/1996 | Andrew et al. ........ 379/202.01 |
| 5,802,160 A | * | 9/1998 | Kugell et al. .......... 379/211.04 |
| 6,445,915 B1 | | 9/2002 | Baiyor et al. |

* cited by examiner

Primary Examiner—Harry S. Hong
Assistant Examiner—Bing Bui

(57) ABSTRACT

An apparatus, method and system are disclosed for providing call progress and status information for multiple leg telecommunication sessions, such as for flexible alerting, for intelligent network services. The preferred wireless system embodiment includes a home location register and a mobile switching center. The home location register stores a plurality of secondary directory numbers associated with a pilot directory number. The mobile switching center differentially processes and routes each outgoing call leg associated with each secondary directory number, to form a plurality of outgoing call legs. As the various outgoing call legs may be answered, not answered, released, have routing failures, or return busy signals, the mobile switching center generates corresponding call progress and status information. In the preferred embodiment, such call progress and status information includes parameters, for each outgoing call leg, such as time to answer, answer reason, no answer reason, busy reason, page response reason, no page response reason, and routing failure reason. The mobile switching center transmits the call progress and status information to the home location register, for subsequent dynamic utilization in providing intelligent network services, preferably utilizing a modified, ANSI-41 compatible information directive.

32 Claims, 6 Drawing Sheets

APPARATUS METHOD AND SYSTEM FOR PROVIDING CALL PROGRESS INFORMATION FOR MULTIPLE LEG TELECOMMUNICATION SESSIONS FOR INTELLIGENT NETWORK SERVICES

CROSS-REFERENCE TO RELATED APPLICATIONS

This application is related to Baiyor et al., U.S. patent application Ser. No. 09/094,837, now U.S. Pat. No. 6,009,159, entitled "Apparatus, Method And System For Controlling The Start Of Alerting Of Multiple Leg Telecommunication Sessions", filed Jun. 15, 1998, commonly assigned to Lucent Technologies, Inc., and incorporated by reference herein, with priority claimed for all commonly disclosed subject matter (the "first related application").

This application is related to Baiyor et al., U.S. patent application Ser. No. 09/097,334, now U.S. Pat. No. 6,005,930, entitled "Apparatus, Method And System For Controlling Secondary Treatment By a Distant Switch Of Multiple Leg Telecommunication Sessions", filed Jun. 15, 1998, commonly assigned to Lucent Technologies, Inc., and incorporated by reference herein, with priority claimed for all commonly disclosed subject matter (the "second related application").

This application is related to Baiyor et al., U.S. patent application Ser. No. 09/097,527, now U.S. Pat. No. 6,115,461, entitled "Apparatus, Method And System For Providing Information To A Called Party In Multiple Leg Telecommunication Sessions", filed Jun. 15, 1998, commonly assigned to Lucent Technologies, Inc., and incorporated by reference herein, with priority claimed for all commonly disclosed subject matter (the "third related application").

This application is related to Baiyor et al., U.S. patent application Ser. No. 09/342,499, now U.S. Pat. No. 6,399,660 B1, entitled "Apparatus, Method And System For Providing Variable Alerting Patterns For Multiple Leg Telecommunication Sessions", filed Jun. 29, 1999, commonly assigned to Lucent Technologies, Inc., and incorporated by reference herein, with priority claimed for all commonly disclosed subject matter (the "fourth related application").

This application is related to Baiyor et al., U.S. patent application Ser. No. 09/350,439, now U.S. Pat. No. 6,445,915 B1, entitled "Apparatus, Method And System For Providing Variable Termination Patterns For Multiple Leg Telecommunication Sessions", filed concurrently herewith, commonly assigned to Lucent Technologies, Inc., and incorporated by reference herein, with priority claimed for all commonly disclosed subject matter (the "fifth related application").

FIELD OF THE INVENTION

The present invention relates in general to telecommunication systems, and more particularly, to an apparatus, method and system for providing call progress information for multiple leg telecommunication sessions for intelligent network services.

BACKGROUND OF THE INVENTION

With the advent of increasingly sophisticated telecommunication services, various proposals have been made to allow a single call, incoming to a telecommunication switch, to branch into multiple, independent outgoing calls (or legs) to different called parties, during the same period of time. These incoming and multiple outgoing calls may be wireline, such as PSTN (public switched telephone network), ISDN (integrated services digital network), or T1/E1 wireline calls, or may be wireless, such as cellular calls or other mobile service communications.

Once such proposal is included in the ANSI-41 specification promulgated by the American National Standards Institute for wireless telecommunication, such as cellular communication, and is referred to as "flexible alerting". The ANSI-41 flexible alerting specification, however, does not include any specific directions or guidelines for implementation and control of such independent, concurrent outgoing multiple leg calls.

The ANSI-41 flexible alerting specification also does not include the provision of call progress and status information to, for example, provide intelligent network services. As disclosed in the fifth related application, such intelligent network services includes the variation of the list or pattern of outgoing call legs, to parties other than those initially specified.

Other prior art systems which utilize call progress information for various purposes are generally not automatic; rather information from sources such as billing records may be collected and analyzed by an individual person, who at a later date then manually enters system changes on the basis of his or her analysis. In addition, such provision of call progress information is not in real time, is static until manually changed again, and is not automatically and immediately updated on a dynamic basis.

As a consequence, a need remains for an apparatus, method and system to provide call progress and status information for multiple leg telecommunication sessions for intelligent network services. Such an apparatus, method and system should provide such call progress information automatically and without user intervention, should be user friendly, and should be user transparent. Such call progress information should also be provided in real time and on a dynamic basis, to be responsive to changing environmental and user conditions which may arise in wireless or wireline communication systems.

SUMMARY OF THE INVENTION

An apparatus, method and system are disclosed for providing supplemental call progress and status information for multiple leg telecommunication sessions, such as for flexible alerting, for intelligent network services. Such supplemental call progress information is useful, for example, as disclosed in the fifth related application, for varying the membership (termination list) of a flexible alerting group, dynamically and in real time. In the preferred embodiment, such call progress information includes parameters, for each outgoing call leg, such as a time to answer, an answer reason, a no answer reason, a busy reason, a page response reason, a no page response reason, and a routing failure reason.

The preferred wireless system embodiment includes a home location register and a mobile switching center. The home location register stores a plurality of secondary directory numbers associated with a pilot directory number. The mobile switching center differentially processes and routes each outgoing call leg associated with each secondary directory number, to form a plurality of outgoing call legs. As the various outgoing call legs may be answered, not answered, released, have routing failures, or return busy signals, the mobile switching center generates corresponding call progress and status information. The mobile switching center transmits the call progress and status information to the home location register, for subsequent dynamic utilization in providing intelligent network services, preferably utilizing a modified, ANSI-41compatible information directive.

Numerous other advantages and features of the present invention will become readily apparent from the following detailed description of the invention and the embodiments thereof, from the claims and from the accompanying drawings.

DETAILED DESCRIPTION OF THE INVENTION

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

In accordance with the present invention, an apparatus, method and system are illustrated which provide call progress and status information for multiple leg telecommunication sessions for intelligent network services. The apparatus, method and system of the present invention provide such call progress and status information automatically and without user intervention, are user friendly and user transparent. In addition, such call progress and status information is provided in real time and on a dynamic basis, to be responsive to changing environmental and user conditions which may arise in wireless or wireline communication systems.

As mentioned above, the new ANSI-41 specification provides a communications standard for flexible alerting for wireless communications, as a terminating feature or terminating call service. In this specification, a call is placed to a special directory number ("DN") referred to as a pilot directory number ("pilot DN") or as a primary directory number ("primary DN"). A subscriber or other user of flexible alerting or other multi-leg communications, typically predefines a group of other directory numbers, referred to herein as secondary DNs, which are to be associated with the pilot or primary DN, such that when a call is placed to the primary DN, all of the secondary DNs are alerted. Such a list or grouping may be referred to as a flexible alerting group, or more broadly as an alerting group or a secondary DN group, (and may also be referred to as a termination group or list when incorporated in certain response messages discussed below). The incoming call to the pilot DN is then to be processed by a mobile switch, which then directs the incoming call to the multiple different mobile or wireline secondary DNs of the user's predefined alerting group, creating multiple different outgoing communication legs to these differing and independent directory numbers. Whichever outgoing call leg is first to answer will receive the call and be connected to the calling party, with the other call legs released (i.e., dropped or torn down, with their corresponding alerting ceased).

Such flexible alerting or other multi-leg communication may be useful, for example, in businesses involving sales, repairs, or dispatching services. Such flexible alerting may also be useful for other business and personal uses, such as multiple calls to a home, office, and cellular telephone. For example, a child may call a single DN, namely, a parent's pilot DN, which will then alert the telephones at all the associated directory numbers or lines defined in the parent's alerting group or list, such as their home DN, business office DN, home office DN, and cellular or other mobile telephone DN. Presuming the parent is present, the parent will be alerted at any and all of these locations from the placement of a single telephone call.

Figure 1A:
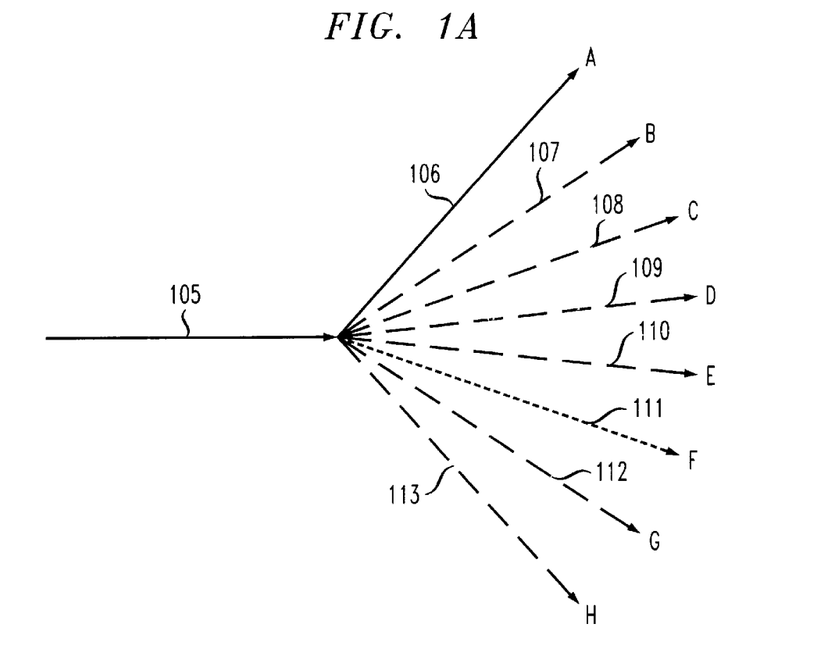
FIG. 1A is a graphical diagram illustrating a first scheme for alerting of multiple outgoing communication sessions, prior to the generation of call progress information in accordance with the present invention.

FIG. 1A is a graphical diagram illustrating such a flexible alerting scheme for alerting of multiple outgoing communication sessions, prior to the generation of call progress and status information in accordance with the present invention. As illustrated in FIG. 1A, an incoming call leg 105, designating a pilot DN (or other primary DN), is processed by a switch to generate multiple outgoing call legs to a flexible alerting group of secondary DNs A–H: outgoing call leg 106 to secondary DN "A"; outgoing call leg 107 to secondary DN "B"; outgoing call leg 108 to secondary DN "C"; outgoing call leg 109 to secondary DN "D"; outgoing call leg 110 to secondary DN "E"; outgoing call leg 111 to secondary DN "F"; outgoing call leg 112 to secondary DN "G"; and outgoing call leg 113 to secondary DN "H".

Continuing to refer to FIG. 1A, outgoing call leg 106 to secondary DN "A" has been illustrated as a first to answer call leg, which in accordance with ANSI-41, is then connected to incoming call leg 105 to create a communication session (illustrated as communication session 115 in FIGS. 1B and 1C), and the remaining outgoing call legs B–H are released. As illustrated in FIG. 1A, however, outgoing call leg 111 is problematic, such that no outgoing call leg was actually received by secondary DN "F". For example, the secondary DN may have been improperly encoded in the switch, resulting in a routing failure, with the outgoing call leg being transmitted to a non-existent DN. Also for example, an outgoing call leg may have been processed for transmission to a mobile telephone which has not responded to a page ("no page response"). As discussed in greater detail below, this information and other, related information is provided, in real time, for utilization on a dynamic basis, for example, to avoid such routing failures in the future or to avoid transmitting another call to a secondary DN which is occupied with a current call. Such information is referred to herein as supplemental call progress and status information, and in the interests of brevity, may be referred to herein simply as call progress information.

The ANSI-41 specification, however, does not address the provision of such call progress information for dynamic control of these multiple outgoing calls. Rather, the ANSI-41 specification merely addresses and requires that an incoming call to a pilot DN be routed to the associated, secondary DNs of the flexible alerting group, with the calling party ultimately connected to the answering party. An exemplary lack of such provision and utilization of such call progress information, and potential resulting inefficiencies, are illustrated with respect to FIG. 1B.

Figure 1B:
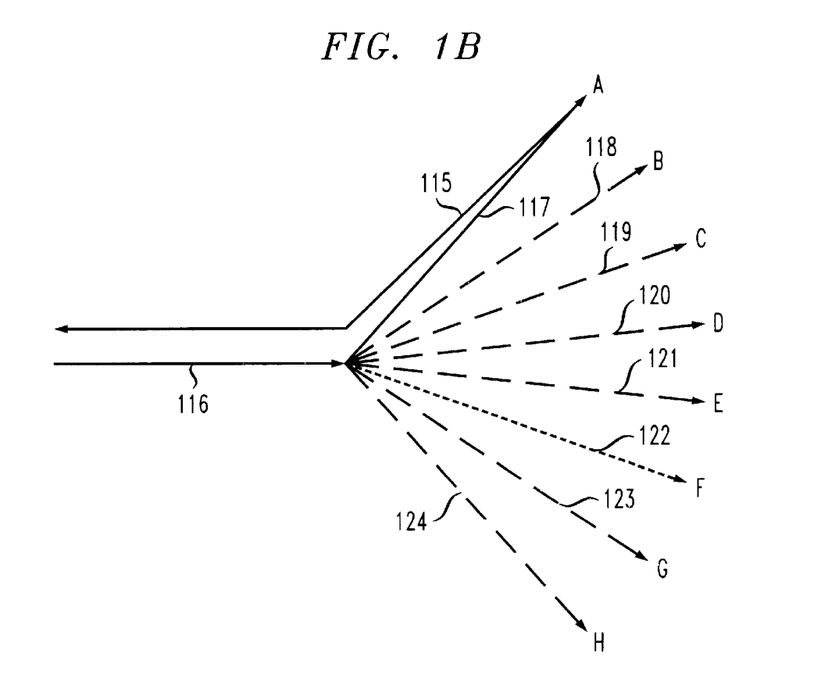
FIG. 1B is a graphical diagram illustrating a second scheme for alerting of multiple outgoing communication sessions, subsequent to the alerting illustrated in FIG. 1A, without the utilization of call progress information of the present invention.

FIG. 1B is a graphical diagram illustrating a second scheme for alerting of multiple outgoing communication sessions, subsequent to the alerting illustrated in FIG. 1A, without the utilization of call progress information of the present invention. As illustrated in FIG. 1B, due to the previous incoming call leg 105, a communication session 115 has already been established with the called party of secondary DN "A". Following the establishment of the communication session 115, a second incoming call leg 116 designating the same pilot DN (or other primary DN), is processed by the switch, without the call progress information of the present invention, to generate the same multiple outgoing call legs to the same flexible alerting group of secondary DNs A–H: outgoing call leg 117 to secondary DN "A"; outgoing call leg 118 to secondary DN "B"; outgoing call leg 119 to secondary DN "C"; outgoing call leg 120 to secondary DN "D"; outgoing call leg 121 to secondary DN "E"; outgoing call leg 122 to secondary DN "F"; outgoing call leg 123 to secondary DN "G"; and outgoing call leg 124 to secondary DN "H".

Without supplemental call progress information generated in accordance with the present invention, FIG. 1B illustrates several potential problems that may arise under the ANSI-41 specification. First, as illustrated in FIG. 1B, secondary DN "A", while engaged with communication session 115, receives and answers a second call, outgoing call leg 117, such as through call waiting. This reception of such a second call may result in an inefficient use of resources, as the party of secondary DN "A" may already be fully occupied with the previous communication session 115 and may be, for example, involved in helping a customer and should not be interrupted; a second customer on incoming call leg 116 may be better served by another member of the flexible alerting group (another secondary DN), who is not already occupied with a customer on another call. In addition, network resources have also been used inefficiently in FIG. 1B, as another outgoing call leg 122 has been generated but has not been received by the intended secondary DN "F".

As may be apparent from the discussion above, in accordance with the present invention, the immediate and dynamic utilization of call progress information, generated from previous flexible alerting sessions, may be highly valuable and produce significant network and user efficiencies. An exemplary scheme for utilization of call progress information is illustrated in FIG. 1C.

Figure 1C:
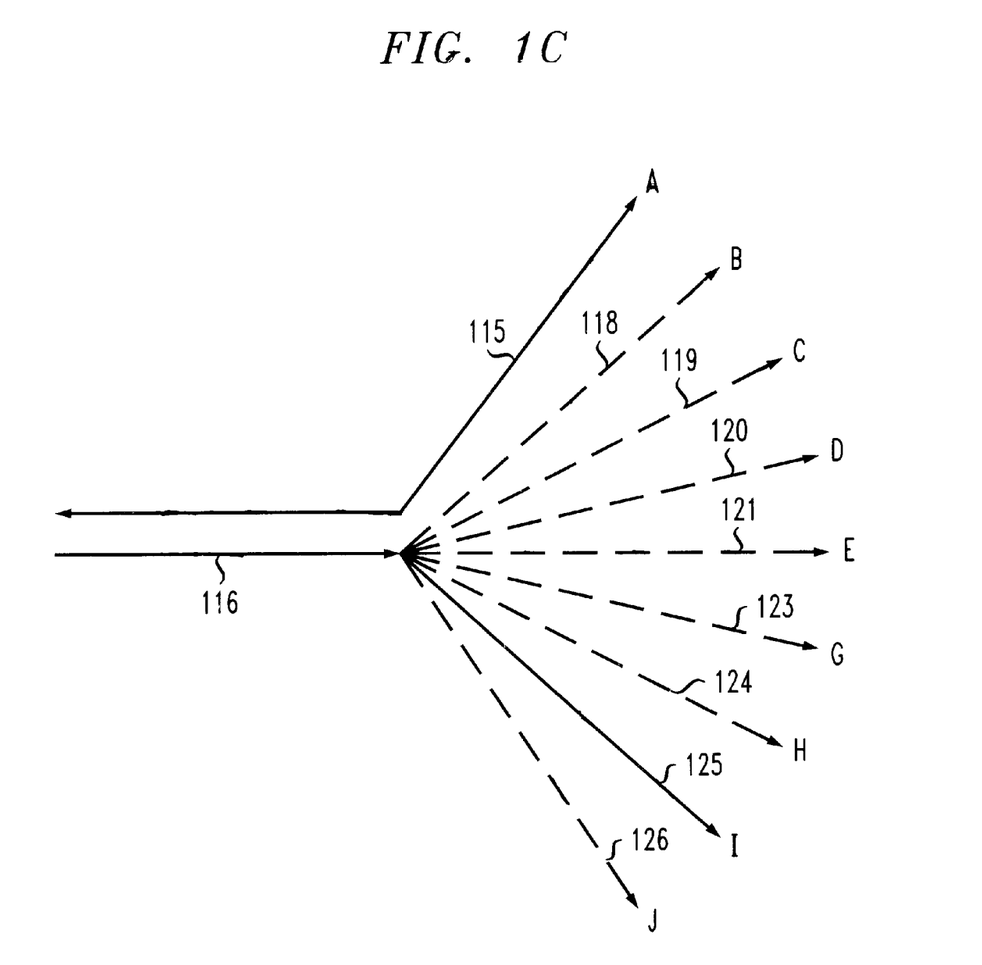
FIG. 1C is a graphical diagram illustrating a third scheme for alerting of multiple outgoing communication sessions, subsequent to the alerting illustrated in FIG. 1A, with the utilization of a portion of the call progress information provided in accordance with the present invention.

FIG. 1C is a graphical diagram illustrating an exemplary scheme for alerting of multiple outgoing communication sessions, with the utilization of a portion of the call progress information provided following the alerting illustrated in FIG. 1A, in accordance with the present invention. Based upon FIG. 1A, such call progress information preferably includes information that the secondary DN "A" is currently engaged with another communication session 115, and that secondary DN "F" did not receive an outgoing call leg 111 because, for example, of a routing failure due to an erroneous encoding of the secondary DN in the original establishment of the flexible alerting group. As a consequence, based upon this call progress information, the outgoing call legs may be routed differently, and in accordance with the invention disclosed in the fifth related application, the flexible alerting group may be varied on a dynamic basis, and in real time.

As illustrated in FIG. 1C, due to the previous incoming call leg 105, a communication session 115 also has already been established with the called party of secondary DN "A". Following the establishment of the communication session 115, a second incoming call leg 116 also designating the same pilot DN (or other primary DN), is processed by the switch, with the supplemental call progress information discussed above, to generate multiple outgoing call legs to a varied flexible alerting group of secondary DNs, which differs from the alerting group of FIG. 1A. More specifically, outgoing call legs to secondary DN "A" and secondary DN "F" are not generated, while other outgoing call legs are generated as follows: (same) outgoing call leg 118 to secondary DN "B"; (same) (same) outgoing call leg 119 to secondary DN "C"; (same) outgoing call leg 120 to secondary DN "D"; (same) outgoing call leg 121 to secondary DN "E"; (same) outgoing call leg 123 to secondary DN "G"; (same) outgoing call leg 124 to secondary DN "H"; (new) outgoing call leg 125 to secondary DN "I", illustrated as an answering call leg; and (new) outgoing call leg 126 to secondary DN "J". As a consequence, the party of secondary DN "A" engaged in communication session 115 is not interrupted, and network resources are not wasted by erroneously sending an outgoing call leg to secondary DN "F". Instead, based upon the call progress information of the present invention, and in accordance with the invention of the fifth related application, additional call legs are transmitted to new or additional parties, secondary DNs "I" and "J", effectively dynamically redefining and varying the flexible alerting group in real time.

Figure 2:
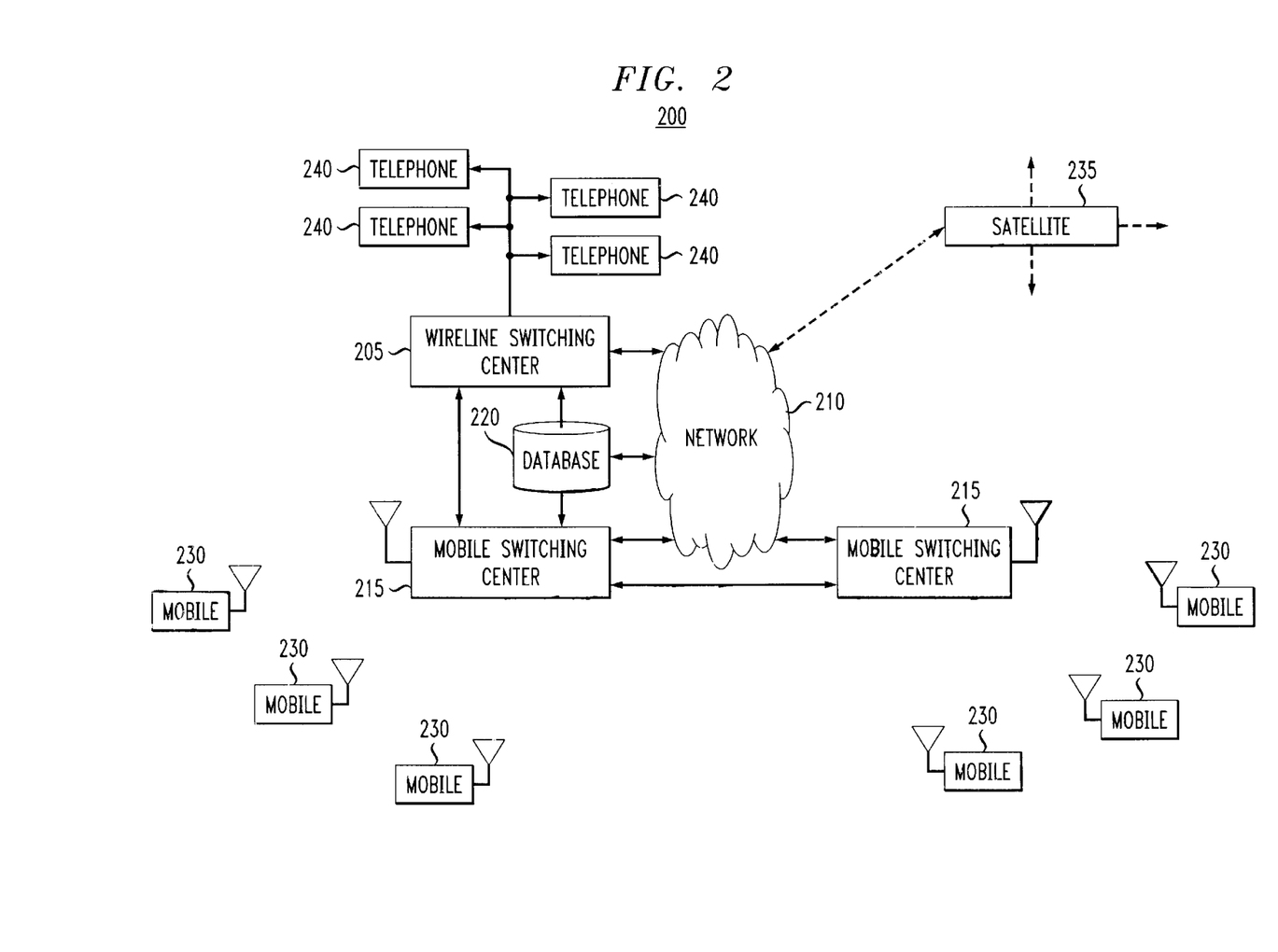
FIG. 2 is a block diagram illustrating a first system embodiment in accordance with the present invention.

FIG. 2 is a block diagram illustrating a first system embodiment 200 in accordance with the present invention. The system 200 includes one or more mobile switching centers ("MSCs") 215 and one or more wireline switching centers 205, which may also be connected via trunk and signaling lines to each other and to a broader network 210, such as a PSTN or ISDN network providing multiple telecommunication connections to other locations, such as providing a link to satellite 235. The system 200 also includes a database 220, which is preferably connected or coupled to a wireline switching center 205 and to a MSC 215. A database 220 may also be directly included or integrated within the various switching centers 205 and 215. The wireline switching center 205 is also generally connected to a plurality of telephones 240 or other customer premise equipment, while the MSCs 215 (via base stations or other wireless transceivers, not separately illustrated) typically have a wireless link to the various mobile units 230, such as cellular telephones within a particular geographic region. In addition, while the wireline and mobile switching centers 205 and 215 are usually physically separated due to regulatory and other historical reasons, these switching centers may also be combined into one or more switching centers having both wireline and wireless functionalities.

Continuing to refer to FIG. 2, an incoming call directed to a primary DN may be received by either the wireline switching center 205 or one of the mobile switching centers 215. The switching center 205 or 215 then transmits a request to database 220 for an alerting list containing the secondary directory numbers associated with the primary or pilot DN (such as a termination list). In accordance with the related inventions, the database 220 transmits a response to the corresponding switching center 205 or 215, containing or listing the associated DNs and each of their corresponding parameters (one set of parameters for each associated DN), such as each of their timing delay parameters (ring start adjustment time ("RSAT") values), no answer time parameters (NAT values), and no answer termination trigger parameters. Utilizing these corresponding parameters, the switching center 205 or 215 begins the processing and routing of the associated outgoing call legs, with such processing and routing of each outgoing call leg delayed according to its corresponding timing delay parameter, and unless one of the call legs is answered, with each such outgoing call leg allowed to be alerted according to its no answer time parameter, followed by release according to its no answer termination trigger parameter.

In accordance with the present invention, during and following such a flexible alerting session, the switch, such as the mobile switching center 215 or wireline switching center 205 generates and transmits call progress information to the database 220. As discussed above, such call progress information may include, for example, identification of the answering call leg, such as outgoing call leg 106 to secondary DN "A", and information concerning routing failures, such as outgoing call leg 111 to secondary DN "F". In addition, as discussed in greater detail below, other call progress information may include parameters such as the elapsed time for an outgoing call leg to be answered, or information related to various aspects of routing, such as a page response, a no page response, a busy reason, a no answer reason, an answer reason, or a routing failure as mentioned previously.

Figure 3:
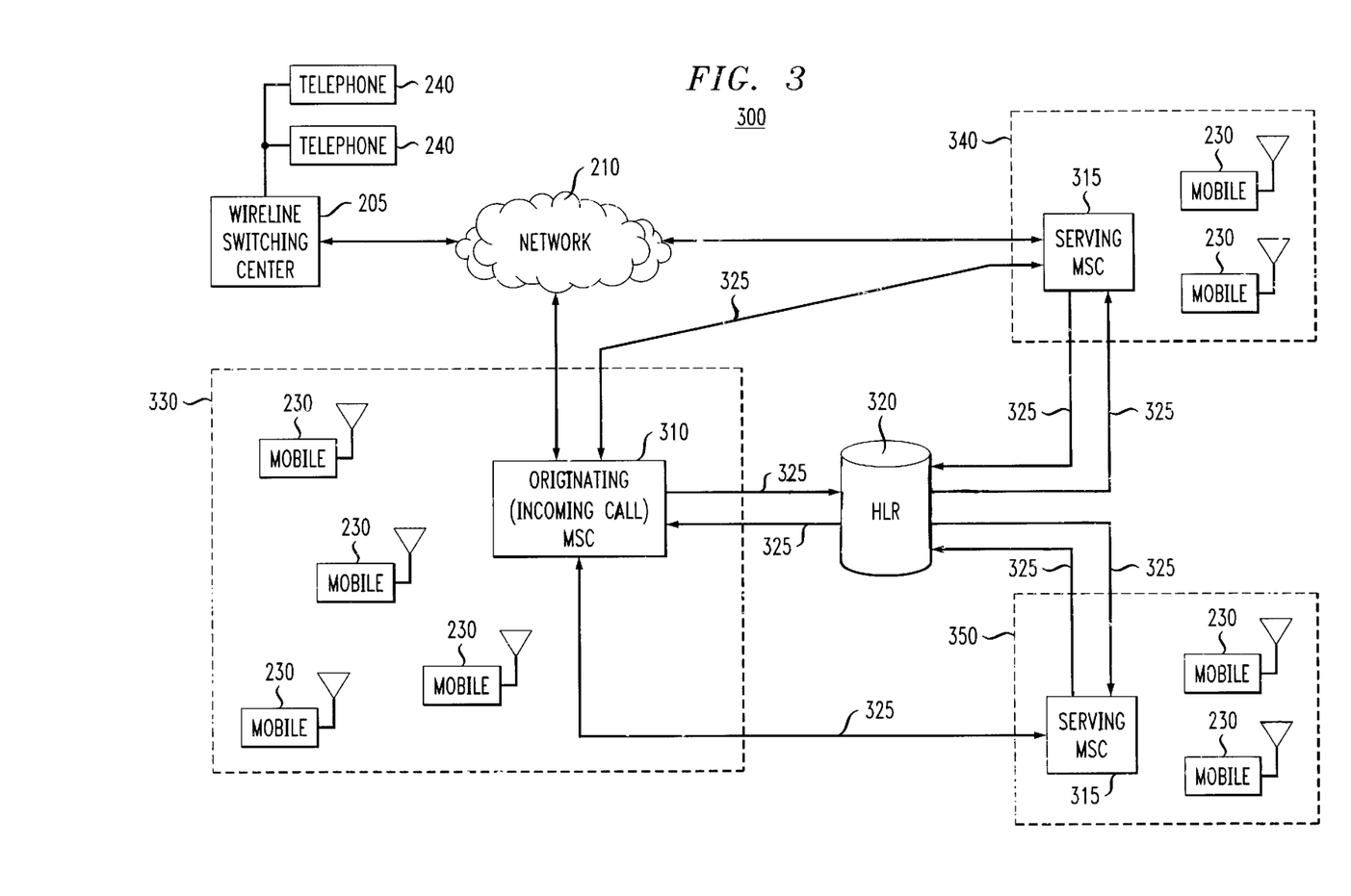
FIG. 3 is a block diagram illustrating a second system embodiment for wireless communication in accordance with the present invention.

FIG. 3 is a block diagram illustrating a second, preferred system embodiment 300 for wireless communication in accordance with the present invention, such as for ANSI-41 flexible alerting. In this system 300, the mobile switching centers 215 are represented by two types of MSCs. The first type of MSC, referred to as an incoming call or originating MSC 310, directly provides service to the mobile units 230 within its designated or predetermined geographic region 330. The second type of MSC, referred to as a serving MSCs 315, provides service to mobile units 230 which have traveled or roamed into their designated or predetermined geographic regions 340 and 350. A stand-alone home location register ("HLR") 320 is utilized in this preferred embodiment, among other things, to implement the database 220 and other ANSI-41 signaling functionality. The various MSCs 310 and 315 are preferably connected to the HLR 320 via ANSI-41 signaling interfaces and corresponding links 325. As in the system of FIG. 2, the various MSCs 310 and 315 are also connected or coupled to a wireline switching center 205 and to a network 210, for multiple network connections, such as PSTN, ISDN, or satellite connections.

As indicated above, a user or subscriber typically defines their alerting group of secondary telephone numbers (or other directory numbers). These secondary DNs are those numbers that the subscriber would like alerted when their pilot or other primary DN is called. In accordance with the invention disclosed in the fifth related application, based upon the call progress information of the present invention, such alerting groups or termination lists may be dynamically varied, in real time. Such secondary DNs included in a user defined alerting group or termination list may also be divided into different groupings or sets based upon their potentially differing routing requirements. For example, the wireless and wireline groupings may be utilized, along with subsets of these groupings, such as wireless DNs served by MSCs other than the originating MSC 310. In accordance with the invention disclosed in the first related application, four types of exemplary routing groups or situations are utilized, with their corresponding timing delay parameters for providing concurrent alerting: group 1, wireline DNs, which may be located locally, regionally, nationally or internationally; group 2, wireless DNs in a location served by the originating MSC 310; group 3, wireless DNs in a location served by a serving MSC 315; and group 4, wireless DNs served from a location in which its data or other information is located on a different HLR, i.e., on an HLR other than HLR 320.

Continuing to refer to FIG. 3, when an originating MSC 310 receives an incoming call to or otherwise designating a pilot DN or other primary directory number, the originating MSC 310 transmits a query or other, message to an HLR 320. Such a query is typically in the form of a data packet, and includes a reference to the pilot DN or other primary DN. While the operation of the system 300 is explained with reference to an originating MSC 310, it should be understood that any MSC 215, at any given time, may be serving as either or both an originating MSC 310 or a serving MSC 315. The incoming call to the originating MSC 310 may be a wireless call, from one of the mobile units 230, or may be a wireline call originating from the network 210, such as a PSTN call. In the preferred embodiment, utilizing the ANSI-41 specification, the query transmitted by the originating MSC 310 to the HLR 320 is a "LocationRequest", which is an operation used by an originating MSC 310 to obtain call treatment instructions from the HLR 320, and is initiated with a "TCAP INVOKE (LAST), carried by a TCAP QUERY WITH PERMISSION package, and includes corresponding mandatory and optional parameters as defined in the ANSI-41 specification for a LocationRequest INVOKE, such as pilot DN, billing identification, and originating MSC identifier.

Utilizing its database, the HLR 320 first determines whether the pilot or primary DN is for a flexible alerting group or other multi-leg communications group, and if so, prepares a response or other message containing the secondary DNs (of the user's or subscriber's defined alerting group), and further containing their corresponding parameters, such as RSAT values, NAT values, and termination triggers, in accordance with the present invention. The HLR 320 then transmits, back to the originating MSC 310, a response data packet having a listing of secondary DNs with each of their corresponding parameters (RSAT values, NAT values, and termination triggers).

Additional processing is typically required for situations in which wireless secondary DNs are in a geographical location served by a serving MSC 315, such as regions 340 or 350 illustrated in FIG. 3. As mobile units 230 power on, a signal is typically transmitted between the mobile unit 230 and the MSC serving the geographic region in which the mobile. unit is located, which may be an originating MSC 310 or a serving MSC 315, which signal indicates that the mobile unit 230 is within that service region. In addition, when an originating MSC 310 receives a call for one of its mobile units 230, it typically transmits a request (or page) to that mobile unit 230 to verify its location prior to allocating its resources (such as a wireless channel) and connecting the wireless call. As these various mobile units 230 travel and roam out of the geographic region 330 served by its originating (or "home") MSC 330, and move into regions 340 or 350 served by other MSCs referred to as the serving MSCs 315, the mobile units 230 and the serving MSCs 315 also exchange such location information. For any given call, the serving MSC 315 assigns each such roaming mobile unit 230 a temporary local directory number ("TLDN") for use within its serving geographic region 340 or 350. The serving MSC 315 also transmits this location information to the HLR 320. The HLR 320 maintains and logs this information as each such mobile unit 230 may roam in and out of the various geographic regions, such as regions 330, 340 and 350, and stores such information by typically updating a memory pointer designating the particular serving MSC 315 corresponding to the secondary DN of the roaming mobile unit 230.

As a consequence, when the HLR 320 receives a query from an originating MSC 310 concerning an alerting group corresponding to a primary DN, such as an ANSI-41 LocationRequest, the HLR 320 may have information indicating that a particular mobile unit 230 of the alerting group is or was last known to be in a region 340 or 350 of a serving MSC 315. The HLR 320 then transmits a routing request to the serving MSC 315 for the particular mobile unit 230 (having the corresponding secondary DN of the alerting group), such as an ANSI-41 RoutingRequest INVOKE, requesting a TLDN to correspond to the particular roaming mobile unit 230. The serving MSC 315 assigns such a TLDN to the particular roaming mobile unit 230, and transmits this TLDN information to the HLR 320, such as in an ANSI-41 RoutingRequest RETURN RESULT data packet. This TLDN information (instead or in lieu of a secondary DN) is then included in the location response data package transmitted by the HLR 320 to the originating MSC 310, as mentioned above, with a corresponding parameters (RSAT, NAT and termination triggers). As the originating MSC 310 processes and routes the outgoing call legs to the secondary DNs of the alerting group with their corresponding timing delays, the originating MSC waits the predetermined period of time designated by the corresponding timing delay parameter (if any), and then processes and routes the outgoing call leg to the particular roaming mobile unit 230 utilizing its TLDN. Such a call may be routed from the originating MSC 310 to the serving MSC 315 through either a direct signaling and trunk connection 335, if it exists, or may be routed through the network 210, such as the PSTN.

The originating MSC 310, utilizing the information contained in the response data packet (the listing of secondary DNs or TLDNs and each of their corresponding parameters), begins the processing and routing of each outgoing call leg to each secondary DN, with: (1) such processing and routing delayed (if at all) according to each secondary DN's respective timing delay parameter; (2) alerted for the duration of its no answer time parameter, unless an outgoing call leg has been previously answered; and (3) released or otherwise treated according to its no answer termination trigger, also unless another outgoing call leg has been previously answered. If and when one of these outgoing call legs is answered, the originating MSC 310 connects the calling party (incoming leg) to that answered outgoing leg, followed by releasing the remaining outgoing legs and ceasing their alerting.

As mentioned above, in accordance with the present invention, during and following any such flexible alerting session, supplemental call progress information is generated or otherwise available to a switch, such as an MSC 215 or 310. In the preferred embodiment, the call progress information is generated and transmitted to a corresponding database 220 or HLR 320. The database 220 or HLR 320, in turn, in accordance with the invention disclosed in the fifth related application, may utilize the call progress information to, For example, vary the flexible alerting group to include or exclude secondary DNs, or to generate error messages or notations indicative of a routing failure (to allow for re-entry or re-coding of an erroneous secondary DN, also for example). In the preferred embodiment, the following types of call progress information are generated for subsequent utilization, in real time and on a dynamic basis: (1) time to answer; (2) routing failure reason; (3) no page response; (4) page response; (5) busy reason; (6) no answer reason; and (7) answer reason. In addition, depending upon the desired implementation, information concerning the duration of the answered call (the time period from the answer to the termination) may also be utilized.

For the answering outgoing call leg, the time to answer (i.e., how much time elapsed between commencement of alerting of that outgoing call leg and when it was answered) may provide useful information for a flexible alerting program. Knowledge of which secondary DN answered, and how quickly the call was answered, may be useful for varying the flexible alerting group. For example, an outgoing call leg that was answered very quickly may indicate that the answering party was already engaged with a prior call and answered the outgoing call leg on a call waiting basis, indicating that the answering party should not be included in the flexible alerting for the next incoming call.

A routing failure reason, namely, why a particular outgoing call leg could not be delivered, also provides significant information for the proper implementation of a flexible alerting program, from providing sufficient service to evaluating potential consumer complaints. For example, a service provider may immediately correct a routing failure due to a wrong number, or improper coding of the secondary DN, in contrast to a routing failure due to all trunks having a busy condition.

As mentioned above, prior to the transmission of an outgoing call leg to the mobile units 230, the various mobile units 230 respond (or do not respond) to a page to determine their location within a given serving region, such as within the region of an originating MSC 310 or a serving MSC 315 (roaming). Information pertaining to whether a particular mobile unit 230 responded (or did not respond) to a given page may influence the paging strategy utilized for the particular mobile unit 230, and may be particularly helpful in evaluating a potential situation in which a particular mobile unit 230 is not receiving a sufficient number of flexible alerting calls. The various paging strategies, which may be altered based on the call progress information, for example, may include paging all cells, paging only the last cell in which the mobile unit was located, paging surrounding cells, or paging multiple times. Also for example, certain mobile units may respond immediately to a first page; as a consequence, a no page response to the first page may be a good indicator that the mobile unit is not located within the region, and a potential second page is unnecessary. Similarly, a page response may indicate a successful paging strategy for a particular mobile unit 230, which may be desirable to repeat in the future.

A busy reason for a particular mobile unit may provide information important to the participants in the flexible alerting group. For example, a busy reason may indicate that a particular mobile unit 230 was already engaged with two communication sessions, an initial call followed by a second call answered with call waiting. Such information may be useful for the dynamic variation of the participants (secondary DNs) within the flexible alerting group, or to provide user feedback, such as to indicate a potential need to expand the number of participants in the group to accommodate traffic and increase availability.

An answer reason or a no answer reason may provide similar information. For example, a no answer may occur because the particular mobile unit 230 was already engaged with a communication session, and did not answer on a call waiting alert. Conversely, an answer may occur during a call waiting condition, or may be a simple answer of an initial call (without call waiting). A no answer reason or an answer reason may also provide useful time-of-day patterns; for example, patterns may develop that certain secondary DNs never answer calls from midnight to 6 a.m., indicating that other secondary DNs should be alerted instead. Such information also may be useful for the dynamic variation of the flexible alerting group, or providing the other types of feedback mentioned above.

In the preferred embodiment, such call progress information is transmitted by the switch, such as an MSC 215, to the database 220 (or HLR 320). Upon receipt of this call progress information, the HLR 320 (or database 220) may then automatically adjust or modify various features of the particular flexible alerting program. As mentioned above, in accordance with the invention of the fifth related application, the various secondary DNs participating within the flexible alerting group may be modified dynamically, in real time. In other circumstances, various error messages may be generated, particularly for routing failures, and paging strategies may be modified.

The ANSI-41 specification, however, does not provide for such transmission of call progress information to an HLR 320 (or database 220, or a service control point (SCP) (not illustrated). As a consequence, in the preferred embodiment of the present invention, call progress information is transmitted utilizing a modified, ANSI-41 compatible format, namely, modifying an information directive ("InformationDirective") of an InformationDirective INVOKE operation that is otherwise available within ANSI-41 to carry the call progress information of the present invention.

More specifically, the information directive operation, defined within ANSI-41 at the same parameter level as a location request, has predefined sub-parameters such as a billing identification, a pilot billing identification, group identification, and leg identification. In accordance with the present invention, the call progress information is carried within a modified information directive as new fields or parameters, referred to as TimeToAnswer, RoutingFailureReason, PageResponseReason, NoPageResponseReason, BusyReason, NoAnswerReason, and AnswerReason. Innumerable other formats, fields or parameters transmitting such call progress information may also be utilized without departing from the spirit and scope of the present invention.

Figure 4:
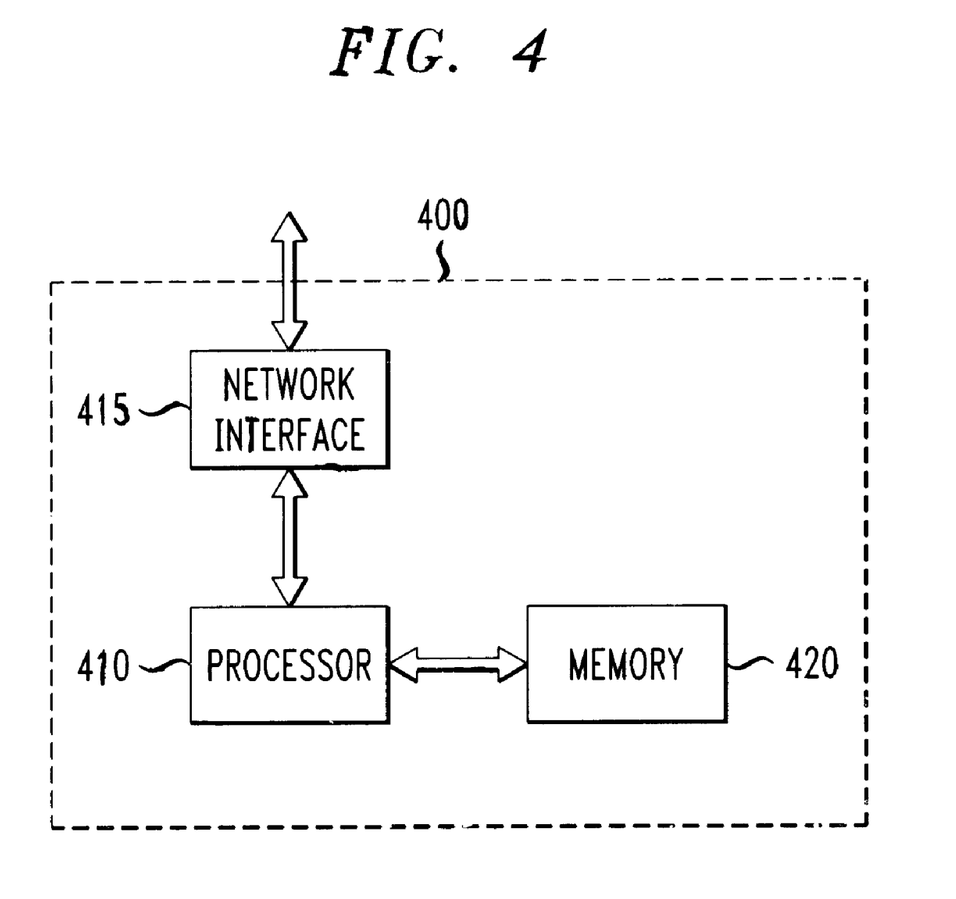
FIG. 4 is a block diagram illustrating an apparatus embodiment in accordance with the present invention.

FIG. 4 is a block diagram illustrating an apparatus embodiment 400 in accordance with the present invention. As discussed in greater detail below, such an apparatus 400 may be included within, or distributed among, an MSC (310 or; 315) or HLR 320 of a system 300, or may be included within, or distributed among, a switching center 205 or 215 and database 220 of system 200. The apparatus 400 includes a processor 410, a network interface 415, and a memory 420. The network interface 415 is utilized to receive an incoming call leg to a pilot DN or primary DN, to transmit the plurality of outgoing call legs to the secondary DNs associated with a primary DN, and to transmit and receive the various messages and call progress information discussed above. For example, in system 300, the network interface 415 may be couplable to the network 210 (via a trunk and signaling line) for transmission and reception of PSTN calls, and couplable to an antenna for transmission and reception of wireless calls. The memory 420 may be a magnetic hard drive, an optical storage device, or any other type of data storage apparatus. The memory 420 is used to store information pertaining to primary DNs, such as all associated secondary DNs and their parameters, other call placement and routing information, and/or the call progress information of the present invention. The memory 420 performs such information storage comparable to the information storage of the database 220 or HLR 320.

Continuing to refer to FIG. 4, the processor 410 may include a single integrated circuit ("IC"), or may include a plurality of integrated circuits or other components connected, arranged or grouped together, such as microprocessors, digital signal processors ("DSPs"), application specific integrated circuits ("ASICs"), associated memory (such as RAM and ROM), and other ICs and components. As a consequence, as used herein, the term processor should be understood to equivalently mean and include a single processor, or arrangement of processors, microprocessors, controllers, or some other grouping of integrated circuits which perform the functions discussed above and also discussed in detail below with reference to FIG. 5, with associated memory, such as microprocessor memory or additional RAM, ROM, EPROM or $E^2$PROM. The methodology of the invention, as discussed above with reference to FIGS. 1–3 and as discussed below with reference to FIG. 5, may be programmed and stored, in the processor 410 with its associated memory and other equivalent components, as a set of program instructions for subsequent execution when the processor 410 is operative (i.e., powered on and functioning).

As mentioned above, such an apparatus 400 may be included within, or distributed among, an MSC (310 or 315) or HLR 320 of a system 300, or may be included within, or distributed among, switching centers 205 or 215 and database 220 of system 200. For example, when included within the system 200, the various switching centers 205 and 215 may incorporate the database 220; in that event, the apparatus 400 may be completely included within either the wireline switching center 205 or the wireless switching center 215. Also for example, when included within the system 300, the apparatus 400 may distributed among the originating MSC 310 and the HLR 320, with the memory 420 incorporated within the HLR 320, with the processor 410 having components within the originating MSC 310 and the HLR 320, and with the network interface 415 incorporated within the MSC 310 (or 315). In such a distributed embodiment for the system 300, the apparatus 400 would also include corresponding ANSI-41 signaling interfaces within the originating MSC 310 and the HLR 320, for communication of the various requests and responses discussed above.

In summary, the apparatus 400 for providing call progress information for multiple leg telecommunication sessions, includes, first a network interface 415 for reception of an incoming call leg designating a primary directory number, for transmission of an outgoing call leg, and for transmission and reception of call progress information; second, a memory 420 having a plurality of secondary directory numbers associated with the primary directory number, and for each secondary directory number of the plurality of secondary directory numbers, further having a corresponding timing delay parameter, a corresponding no answer time parameter, and a corresponding no answer termination trigger; and third, a processor 410 coupled to the memory and the network interface. The processor, when operative, includes program instructions to differentially process and route each outgoing call leg associated with each secondary directory number, of the plurality of secondary directory numbers, according to its corresponding timing delay parameter, and the processor having further instructions to, unless an outgoing call leg of the plurality of outgoing legs has been answered, alert each outgoing call leg for a time period of its corresponding no answer time parameter and, upon an expiration of the time period, treat each outgoing call leg according to its corresponding no answer termination trigger.

During and following such differential processing and routing, the processor has further instructions to generate the call progress information. In the preferred embodiment, the processor generates any applicable call progress information, including a time to answer; a routing failure reason, if any; a no page response, if any; a page response, if any; a busy reason, if any; a no answer reason, if any; and an answer reason. In addition, depending upon the desired implementation, the processor may also include instructions to generate information concerning the duration of the answered call (the time period from the answer to the termination).

Figure 5:
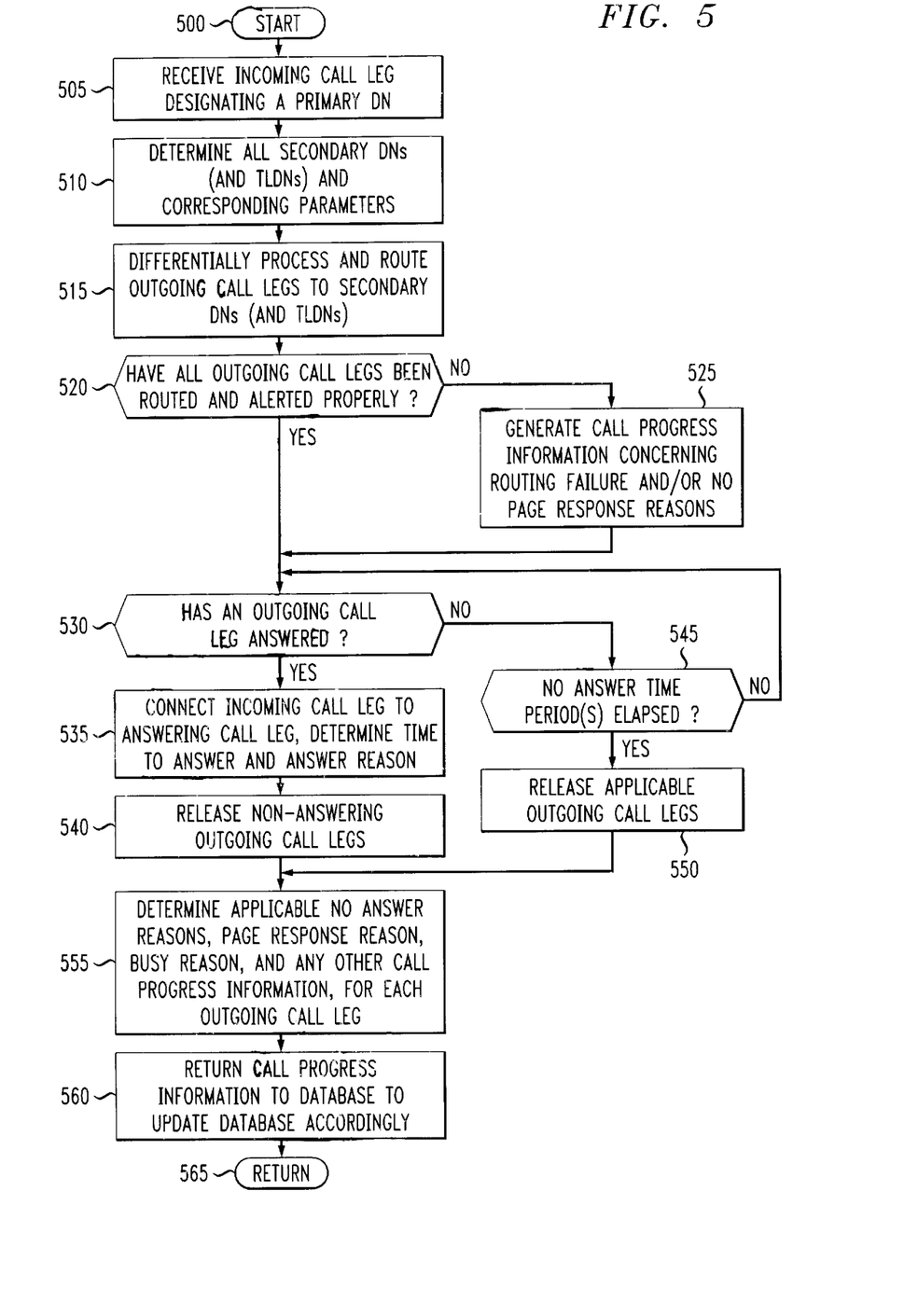
FIG. 5 is a flow diagram illustrating a method embodiment in accordance with the present invention.

FIG. 5 is a flow diagram illustrating a method embodiment in accordance with the present invention. Referring to FIG. 5, the method begins, start step 500, with reception of an incoming call leg designating a primary directory number, step 505. The method then determines all secondary DNs (and TLDNs, if any), and corresponding parameters, such as timing delay parameters, no answer time parameters, and no answer termination triggers, step 510. The outgoing call legs to the secondary DNs (and TLDNs) are differentially processed and routed, step 515.

Based upon such routing and subsequent events, such as answering, call progress information begins to be generated. Following the processing and routing of step 515, the method determines whether all outgoing call legs have been routed and alerted properly, step 520, for example, determining whether there has been a routing failure or a no page response. When not all outgoing call legs have been routed or alerted properly in step 520, the method generates call progress information, for any such outgoing call leg, concerning such a routing failure and/or no page response, or any other reason for the improper alerting or routing, step 525.

When all outgoing call legs have been properly routed and alerted in step 520, or following step 525, the method determines whether an outgoing call leg has been answered, step 530. When an outgoing call leg has been answered in step 530, the incoming call leg is connected to the answering outgoing call leg, to create a communication session, and the method determines corresponding call progress information, such as the time to answer and the answer reason, step 535. Following step 535, the method then releases the non-answering call legs (or otherwise processes each non-answering outgoing call leg according to its no answer termination trigger).

When an outgoing call leg has not been answered yet (or at all) in step 530, the method determines whether corresponding no answer time periods have elapsed, step 545. When no answer time periods have not elapsed in step 545, the method returns to step 530, to monitor answering of outgoing call legs. When no answer time periods have elapsed in step 545, the corresponding outgoing call legs are released, step 550. Not separately illustrated, this portion of the method (steps 545 and 550) may be accomplished through an iterative (loop) process, on a per leg basis, until one outgoing call leg has been answered or until no answer time periods have elapsed for each outgoing call leg, particularly for the implementation of variable alerting patterns, as disclosed in the fourth related application.

Following steps 540 and 550, the method determines any remaining call progress information, such as any applicable no answer reasons, page response reasons, and busy reasons, for each remaining outgoing call leg, step 555. The method then returns such call progress information to a database (such as database 220 or HLR 320), such as through the information directive discussed above, to update the database accordingly (such as for subsequent varying of the members of the flexible alerting group), step 560. Following step 560, the method may end, return step 565.

Numerous advantages of the present invention may be apparent from the discussion above. First, in accordance with the present invention, an apparatus, method and system are illustrated which provide call progress information for multiple leg telecommunication sessions for intelligent network services. Second, the apparatus, method and system of the present invention provide such call progress information automatically and without user intervention, are user friendly and user transparent. In addition, such call progress information is provided in real time and on a dynamic basis, to be responsive to changing environmental and user conditions which may arise in wireless or wireline communication systems.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

We claim:

1. A method for providing call progress information for multiple leg telecommunication sessions, the method comprising:
   (a) receiving an incoming call leg designating a primary directory number;
   (b) determining a list of secondary directory numbers associated with the primary directory number;
   (c) unless a previously routed outgoing call leg has been answered, differentially processing and routing each outgoing call leg associated with each secondary directory number, of the plurality of secondary directory numbers, to form a plurality of outgoing call legs;
   (d) when an outgoing call leg of the plurality of outgoing call legs has been answered, connecting a first answering outgoing call leg for communication with the incoming call leg and releasing remaining outgoing call legs of the plurality of outgoing call legs;
   (e) when an outgoing call leg of the plurality of outgoing call legs has not been answered, alerting each outgoing call leg until expiration of its corresponding no answer time parameter and then treating each outgoing call leg according to its corresponding no answer termination trigger;
   (f) collecting supplemental call progress information for each outgoing call leg of the plurality of outgoing call legs.

2. The method of claim 1, wherein determining a list of secondary directory numbers comprises retrieving the list from a database and the method further comprises transmitting the call progress information to the database.

3. The method of claim 2, wherein the call progress information is transmitted as a modified ANSI-41 Information Directive.

4. The method of claim 1, wherein step (f) further comprises:
when an outgoing call leg of the plurality of outgoing call legs has not been routed, determining a routing failure reason or a no page response reason.

5. The method of claim 1, wherein step (f) further comprises:
when an outgoing call leg of the plurality of outgoing legs has been answered, determining a time to answer and an answer reason.

6. The method of claim 1, wherein step (f) further comprises:
when an outgoing call leg of the plurality of outgoing legs is wireless, determining a page response reason or a no page response reason.

7. The method of claim 1, wherein step (f) further comprises:
when an outgoing call leg of the plurality of outgoing legs has returned a busy signal, determining a busy reason.

8. The method of claim 1, wherein step (f) further comprises:
when an outgoing call leg of the plurality of outgoing legs has not been answered, determining a no answer reason.

9. A system for providing call progress information for multiple leg telecommunication sessions, the system comprising:
a database, the database having stored in a memory a plurality of secondary directory numbers associated with a primary directory number; and
a switching center coupled to the database, the switching center further having an interface for receiving an incoming call leg designating the primary directory number and, unless a previously routed outgoing call leg has been answered, for differentially processing and routing each outgoing call leg associated with each secondary directory number, of the plurality of secondary directory numbers, to form a plurality of outgoing call legs; when an outgoing call leg of the plurality of outgoing call legs has been answered, the switching center having instructions for connecting a first answering outgoing call leg for communication with the incoming call leg and releasing remaining outgoing call legs of the plurality of outgoing call legs; when an outgoing call leg of the plurality of outgoing call legs has not been answered, the switching center having instructions for alerting each outgoing call leg until expiration of its corresponding no answer time parameter and then treating each outgoing call leg according to its corresponding no answer termination trigger; and the switching center having further instructions for determining supplemental call progress information for each outgoing call leg of the plurality of outgoing call legs and transmitting the call progress information to the database.

10. The system of claim 9, wherein the call progress information is transmitted as a modified ANSI-41 Information Directive.

11. The system of claim 9, wherein the switching center has further instructions, when an outgoing call leg of the plurality of outgoing call legs has not been routed, for determining a routing failure reason or a no page response reason.

12. The system of claim 9, wherein the switching center has further instructions, when an outgoing call leg of the plurality of outgoing legs has been answered, for determining a time to answer and an answer reason.

13. The system of claim 9, wherein the switching center has further instructions, when an outgoing call leg of the plurality of outgoing legs is wireless, for determining a page response reason or a no page response reason.

14. The system of claim 9, wherein the switching center has further instructions, when an outgoing call leg of the plurality of outgoing legs has returned a busy signal, for determining a busy reason.

15. The system of claim 9, wherein the switching center has further instructions, when an outgoing call leg of the plurality of outgoing legs has not been answered, for determining a no answer reason.

16. An apparatus for providing call progress information for multiple leg telecommunication sessions, the apparatus comprising:
a network interface for reception of an incoming call leg designating a primary directory number and for transmission of an outgoing call leg;
a memory having a plurality of secondary directory numbers associated with the primary directory number; and
a processor coupled to the memory and the network interface, wherein the processor, when operative, includes program instructions to differentially process and route each outgoing call leg associated with each secondary directory number, of the plurality of secondary directory numbers, to form a plurality of outgoing call legs; the processor having further instructions, when an outgoing call leg of the plurality of outgoing call legs has been answered, to connect a first answering outgoing call leg for communication with the incoming call leg and release remaining outgoing call legs of the plurality of outgoing call legs; the processor having further instructions, when an outgoing call leg of the plurality of outgoing call legs has not been answered, to alerting each outgoing call leg until expiration of its corresponding no answer time parameter and then treat each outgoing call leg according to its corresponding no answer termination trigger; and the processor having further instructions to determine supplemental call progress information for each outgoing call leg of the plurality of outgoing call legs and transmit the call progress information to the memory.

17. The apparatus of claim 16, wherein the call progress information is transmitted as a modified ANSI-41 Information Directive.

18. The apparatus of claim 16, wherein the processor has further instructions, when an outgoing call leg of the plurality of outgoing call legs has not been routed, to determine a routing failure reason or a no page response reason.

19. The apparatus of claim 16, wherein the processor has further instructions, when an outgoing call leg of the plurality of outgoing legs has been answered, to determine a time to answer and an answer reason.

20. The apparatus of claim 16, wherein the processor has further instructions, when an outgoing call leg of the plurality of outgoing legs is wireless, to determine a page response reason or a no page response reason.

21. The apparatus of claim 16, wherein the processor has further instructions, when an outgoing call leg of the plurality of outgoing legs has returned a busy signal, to determine a busy reason.

22. The apparatus of claim 16, wherein the processor has further instructions, when an outgoing call leg of the plurality of outgoing legs has not been answered, to determine a no answer reason.

23. A system for providing call progress information for outgoing call legs for flexible alerting service, the system comprising:

a home location register, the home location register having stored in a memory a plurality of secondary directory numbers associated with a pilot directory number; and a mobile switching center coupled to the home location register, the mobile switching center further having an interface for receiving an incoming call leg designating the pilot directory number and for differentially processing and routing each outgoing call leg associated with each secondary directory number, of the plurality of secondary directory numbers, to form a plurality of outgoing call legs; when an outgoing call leg of the plurality of outgoing call legs has been answered, the mobile switching center having instructions for connecting a first answering outgoing call leg for communication with the incoming call leg and releasing remaining outgoing call legs of the plurality of outgoing call legs; when an outgoing call leg of the plurality of outgoing call legs has not been answered, the mobile switching center having instructions for alerting each outgoing call leg until expiration of its corresponding no answer time parameter and then treating each outgoing call leg according to its corresponding no answer termination trigger; and the switching center having further instructions for determining supplemental call progress information for each outgoing call leg of the plurality of outgoing call legs and transmitting the call progress information to the home location register.

24. The system of claim 23, wherein the call progress information is transmitted as a modified ANSI-41 Information Directive.

25. The system of claim 23, wherein the mobile switching center has further instructions, when an outgoing call leg of the plurality of outgoing call legs has not been routed, for determining a routing failure reason or a no page response reason.

26. The system of claim 23, wherein the mobile switching center has further instructions, when an outgoing call leg of the plurality of outgoing legs has been answered, for determining a time to answer and an answer reason.

27. The system of claim 23, wherein the mobile switching center has further instructions, when an outgoing call leg of the plurality of outgoing legs is wireless, for determining a page response reason or a no page response reason.

28. The system of claim 23, wherein the mobile switching center has further instructions, when an outgoing call leg of the plurality of outgoing legs has returned a busy signal, for determining a busy reason.

29. The system of claim 23, wherein the mobile switching center has further instructions, when an outgoing call leg of the plurality of outgoing legs has not been answered, for determining a no answer reason.

30. A method for improving network efficiency in multiple leg telecommunication sessions, the method comprising:

receiving an incoming call leg designating a primary directory number;

determining a list of secondary directory numbers associated with the primary directory number;

unless a previously routed outgoing call leg has been answered, processing and routing each outgoing call leg associated with each secondary directory number, of the plurality of secondary directory numbers, to form a plurality of outgoing call legs;

when an outgoing call leg of the plurality of outgoing call legs has been answered, connecting a first answering outgoing call leg for communication with the incoming call leg and releasing remaining outgoing call legs of the plurality of outgoing call legs;

when an outgoing call leg of the plurality of outgoing call legs has not been answered, alerting each outgoing call leg until expiration of its corresponding no answer time parameter and then treating each outgoing call leg according to its corresponding no answer termination trigger;

collecting supplemental call progress information for each outgoing call leg of the plurality of outgoing call legs;

updating the list of secondary directory numbers based on the collected supplemental call progress information.

31. The method of claim 30, wherein determining a list of secondary directory numbers comprises retrieving the list from a database and the method further comprises transmitting the call progress information to the database, and updating the list of secondary directory numbers comprises at least one of adding, deleting and changing a secondary directory number in the database based on the transmitted information.

32. The method of claim 31, wherein the call progress information is transmitted as a modified ANSI-41 Information Directive.

\* \* \* \* \*